United States Patent [19]
Thijssen et al.

[11] 4,004,886
[45] Jan. 25, 1977

[54] TWO STAGE CONTINUOUS PROCESS AND APPARATUS FOR CRYSTALLIZATION

[75] Inventors: Henricus A. C. Thijssen, Son, Netherlands; Nicolaas J. J. Huige, Milwaukee, Wis.

[73] Assignee: Stamicarbon B.V., Geleen, Netherlands

[22] Filed: Mar. 7, 1975

[21] Appl. No.: 556,340

Related U.S. Application Data

[63] Continuation of Ser. No. 340,933, March 13, 1973, abandoned, and a continuation-in-part of Ser. No. 96,467, Dec. 9, 1970, abandoned.

[30] Foreign Application Priority Data

Dec. 12, 1969 Netherlands .................. 6918686
Mar. 2, 1970 Netherlands .................. 7002961

[52] U.S. Cl. .................. 23/273 F; 62/541; 62/544; 62/545; 23/301
[51] Int. Cl.² .................. B01D 9/04
[58] Field of Search .............. 23/273 R, 273 F, 295, 23/301 R; 62/58

[56] References Cited
UNITED STATES PATENTS 2,791,333 5/1957 McKay .................. 23/273 F
2,874,199 2/1959 Tarr .................. 23/273 F

*Primary Examiner*—Stephen J. Emery
*Attorney, Agent, or Firm*—Cushman, Darby & Cushman

[57] ABSTRACT

A two stage continuous process and apparatus for crystallization of a solute or solvent from a solution comprising, first, passing the solution through a precrystallization zone with simultaneous cooling and/or rapid evaporation of the solvent resulting in the formation of small crystal nuclei, second, mixing the suspension from the precrystallization zone in a recrystallization zone with a suspension containing crystals of a much greater size than the crystal nuclei formed in the precrystallization zone wherein the crystal nuclei dissolve in the solution of the recrystallization zone and recrystallize on the larger crystals, the recrystallization step being carried out substantially adiabatic, and selectively recirculating part of the solution from the crystallization zone substantially crystal free to the precrystallization zone. Selective recirculation techniques provide a shortened residence time in the precrystallization zone without concurrently shortening the resistance time of the crystals in the crystallization zone.

7 Claims, 6 Drawing Figures

TWO STAGE CONTINUOUS PROCESS AND APPARATUS FOR CRYSTALLIZATION

This is a continuation of application Ser. No. 340,933, filed Mar. 13, 1973, and a Continuation-in-Part of Ser. No. 96,467, filed Dec. 9, 1970, both now abandoned.

The invention is especially useful in the food industry for concentrating aqueous solutions of food products without affecting the delicate food flavors.

BACKGROUND OF THE INVENTION

The present invention relates to an improved process for continuously crystallizing a solute or a mixture of solutes from a solvent or crystallizing a solvent from a solution, wherein the solution is brought to crystallization by cooling and/or evaporation. More particularly, the invention relates to an improved, continuous crystallization process in which the solution is brought to crystallization by cooling and/or evaporation in a first zone where crystal nuclei form and then, in a second zone, crystals grow to the desired dimensions.

A two stage crystallization has been described in British patent specification No. 977,686, published Dec. 9, 1964, in which partial crystallization of the solution is accomplished by cooling the solution in a scraped heat exchanger and the partially crystallized suspension is then introduced and continuously flows through a separate flowthrough device where the crystals are allowed to grow to the desired size. The suspension flow in the flowthrough device is plug flow with residence time being from 1 - 10 hours or longer. In such a process mixing of the entering suspension of small crystals and the suspension of larger crystals leaving the device is at most only negligible. The size and amount of crystals obtained in the plug flow through the crystallizer flowthrough device is comparable to the crystals obtained with a batchwise storage of the solution in a ripening vessel for the same period of time as the residence time in the flowthrough device.

An increase in residence time in the flowthrough device as described above produces a corresponding increase in the average size of the crystals produced. At a constant residence time, the size of crystals produced depends upon the size of the crystal nuclei in the solution coming from the scraped heat-exchanger, i.e., the larger the crystal nuclei produced in the scraped heat-exchanger, the larger the crystals will be which are produced in the flowthrough device. The average size of the crystals produced by the scraped heat-exchanger increases as the formation of actual nuclei in the heat-exchanger decreases. The formation of nuclei can be limited by keeping the heat flux, i.e., the removal of heat per unit time per unit surface of the heat-exchanger, at a small magnitude, as the small heat flux minimizes the undercooling of the suspension at the heat-extracting surface, thereby limiting the formation of crystal nuclei. The reduction in heat flux requires a large increase in cooling surface area and thus the equipment becomes large, bulky and expensive.

A seeding and filter technique for paraxylene production is disclosed in U.S. Pat. No. 2,757,216 dated July 31, 1956 in which paraxylene feedstock is first chilled to a temperature close to but just above the temperature at which paraxylene crystals form, then mixed with a slurry of crystals but at a temperature below the critical crystallization temperature. The chilled mixture is then fed into a holding tank and retained there for a period of from 30 minutes to 3 hours or longer, and larger seed crystals are introduced which also act as a filter aid. From the holding tank slurry is removed and a portion is admixed with the feedstock introduced into the chiller, the remainder sent to a basket centrifuge for crystal separation. The disclosure is quite specific in that a slurry of paraxylene crystals is recycled and introduced back into the chiller.

Crystal purification has been used in the past but has many disadvantages, especially in the food processing industry, as delicate flavor components may be lost by volatilization and oxidation of early-oxidized flavor components may lead to the production of unwanted off-flavors.

In general, in all prior art crystallization processes, the formation of crystal nuclei is controlled at a limited value so that large crystals are obtained rather than an increased number of small crystals. For example, in a crystallizer in which the crystallization is effected from a supersaturated solution, the formation of nuclei increases as the degree of supersaturation increases. As the number of crystal nuclei forming increases, the number of crystals produced increases; however, the average size of the crystals produced decreases. To limit the number of crystal nuclei being produced the heat flux is maintained at a low value which in turn requires a large amount of heat-exchanger surface. The equipment becomes bulky and expensive.

DESCRIPTION OF THE DRAWINGS

FIG. 4 has the purpose to illustrate the influence of crystal size on the resistance against liquid flow of the crystal bed. It is not said that in all instances according to the invention the crystals will be spherically shaped — though ideally they should be — nor that they are all of the same size.

DETAILED DESCRIPTION OF THE INVENTION

Figure 1:
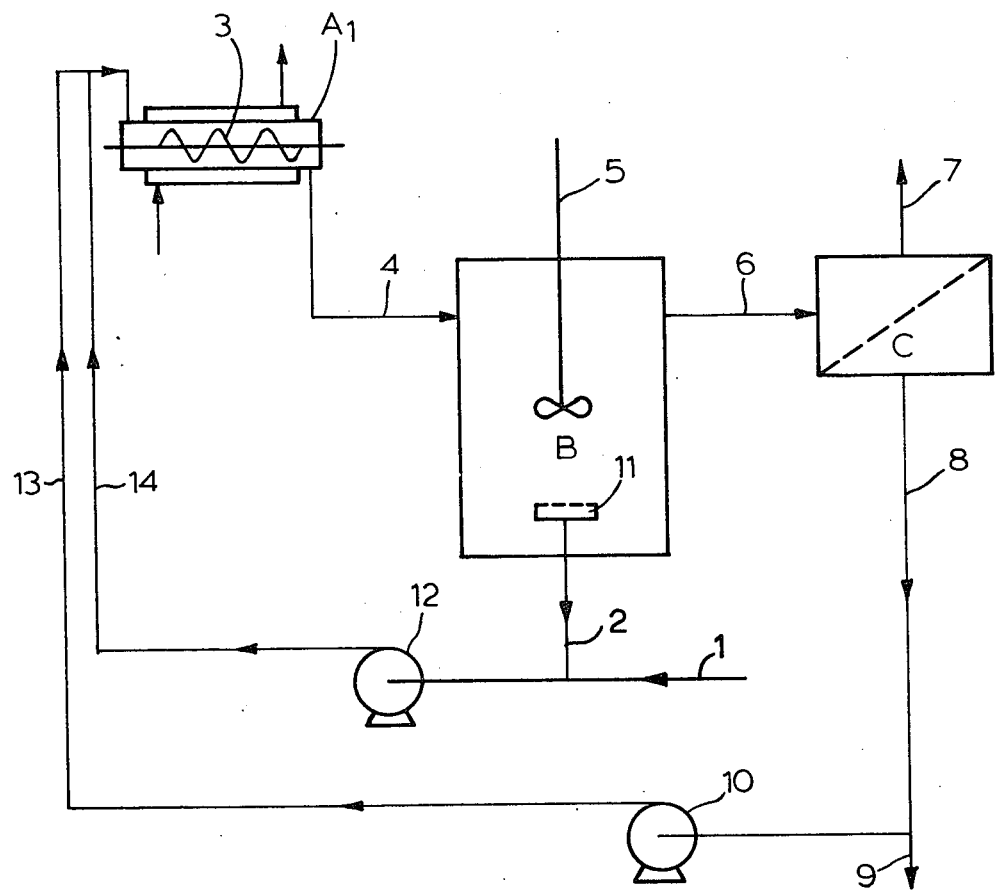
FIG. 1 is a schematic representation of one preferred apparatus and mode of operation of the present process.

The present invention in its apparatus aspect describes apparatus for conducting a rapid crystallization process using a comparatively small precrystallization zone or heat exchanger and which ultimately results in a crystal mass which is easily purified.

The present invention in its process aspect provides a crystallization process in which, contrary to the prior art experience, formation of increased numbers of crystal nuclei results in an increase of the average crystal size.

In its process aspect the present invention also provides a crystallization process which produces increased amounts of crystals having an average particle size which is larger and especially more uniform than the crystals produced by prior art processes in similar sized equipment. Thus equipment which is far less bulky and less expensive than the equipment required in the prior art processes can be utilized which will produce the same amount of crystals of an average size larger and more uniform than produced in more bulky equipment using the prior art processes.

The process of the present invention is accomplished by forming an increased number of crystal nuclei of which a large percentage (e.g. > 99%) are redissolved in the crystallization zone and recrystallized on larger crystals already present in the crystallization zone. It has been unexpectedly found that formation of a large number of the crystal nuclei in crystallization processes is advantageous for the final production of large crystals provided that the crystal nuclei are dissolved in the crystallization zone and recrystallized on the larger crystals present by rapidly mixing the crystal nuclei in a suspension of the larger crystal particles.

The actual phenomena of nuclei dissolution is well known in the field of physical chemistry. Very small crystals of the order of magnitude of 0.1 to 10 microns for the smallest dimension of the crystal possess an appreciably larger solubility than crystals whose smallest crystal-dimension amounts for instance to 100 microns and larger. In a suspension of large and small crystals, the concentration or temperature of the liquid phase adjusts itself to a level between the equilibrium concentration or equilibrium temperature of a solution in contact with the small crystals and the equilibrium concentration or equilibrium temperature of a solution in contact with the larger crystals. Thus, the small crystals tend to dissolve and the large crystals tend to increase in size. As mentioned above, this is a well known laboratory phenomena in physical chemistry. The process according to the invention takes full advantage of this laboratory phenomena on an industrial scale. The present invention then provides apparatus and a process for realizing this known phenomena under actual working conditions.

According to the present invention, a process has been found wherein the solution to be crystallized is first treated in a nuclei-formation zone (also referred to hereinafter as a precrystallization zone or vessel) where many small crystal nuclei are formed. These nuclei are subsequently introduced into a well-stirred crystallization zone and rapidly mixed with the contents thereof under substantially adiabatic conditions. The contents of the crystallization zone contain crystals of an average size at least 10 times larger than the crystal nuclei being mixed therewith. The nuclei tend to dissolve in the solution contained in the crystallization zone and recrystallize upon the larger particles. A portion of the crystal/solution suspension in the crystallization zone is continuously withdrawn and the crystals separated therefrom. The mother liquor or a portion thereof is selectively recycled substantially crystal-free back to the precrystallization zone and the remainder, if any, is discharged as a product stream or as waste.

An important advantage of the present process is that the small nuclei desired can be formed in a simple manner by effecting the rapid and efficient formation of nuclei in the nuclei formation zone within a short residence time.

This strong formation of nuclei may be realized in a simple way, for instance by applying strong cooling of the solution and/or strong evaporation of the solvent in the nuclei formation zone. This is in distinct contrast to the prior art processes wherein the heat- or vapor flux is limited to a small value. The present process is far more effective and less costly in being able to utilize a high heat flux or vapor flux. For instance, it is possible to recover ice from a water solution according to the present invention at a rate of 100–400 kg/m$^2$ of cooling surface per hour in comparison to 10–50 kg/m$^2$ of cooling surface using the prior art process.

In practicing the present invention, it is preferable to keep the residence time in the precrystallization zone and in the conduit connecting the precrystallization zone with the crystallization zone as short as possible. Preferably, the nuclei which are formed in the precrystallization zone should not be given the opportunity of growing to a dimension of more than 10 microns. This can be accomplished by a short residence time of the nuclei in the precrystallization zone and in the conduit to the crystallization zone.

The residence time in the crystallization zone is considerably longer than that in the precrystallization zone which allows those small particles which survive the dissolution phenomena to grow into sufficiently large product crystals.

The average residence time for the nuclei in the precrystallization zone and the time necessary for the nuclei to pass from the precrystallization zone to the crystallization zone should not be more than one minute and, preferably, only a few seconds. The ratio between this time and the average residence time in the crystallization zone should be at most 1:100 and, preferably, 1:1000 to 1:5000. The average residence time in the crystallization zone is preferably between 30 minutes and 1 to 5 hours; however, this time can be shorter or longer as according to the ratio of residence time in the precrystallization zone and the crystallization zone given above. Individual or particular processes differing one from the other depending, in part, on the relative volume of the precrystallization zone and the crystallization zone, the type of solute, the nature of the solvent and the concentration of the solution processed. In practice, however, the above ranges will usually be observed and given the process and apparatus as described herein and the skilled operator would have no difficulty in determining the optional operating parameters.

In the process according to the present invention, as contrary to the prior art processes, an increase in the number of nuclei formed of small particle size results in an increase in the average size of the product crystals in the crystallization zone. The concentration of aqueous solutions by removing ice therefrom is an important process in the food industry, a process to which the present invention is particularly adapted, and for this reason is a preferred embodiment of the present invention.

The process of the present invention can be initiated or commenced by forming a limited number of nuclei in the precrystallization zone which after being transferred to the crystallization zone grow to larger crystals. When sufficiently large crystals have been formed in the crystallization zone, the solution feed to the precrystallization zone is increased to form the large number of nuclei which are transferred to the crystallization zone where they dissolve and recrystallize on the larger crystals. The process can also be commenced by adding crystals directly to the crystallization zone and starting the precrystallization in its normal operation.

The crystallization zone is operated under substantially adiabatic conditions and thus must be separated from the precrystallization zone where the heat and/or solvent is withdrawn by indirect cooling and/or evaporation. The solution is brought to supersaturation in the precrystallization zone. The nuclei formation may occur spontaneously as a result of the supersaturation or can be generated by other techniques such as addition of seed material or subjecting the solution to ultrasonic vibrations.

Preferably a portion of the solution coming from the crystal separation is recycled to the precrystallizer with the remaining discharged from the system.

The invention will be more fully described with reference to the following drawings and examples.

Referring now to FIG. 1, $A_1$ is a schematic representation of a heat exchanger which is equipped with a scraper device 3, B represents a crystallizer provided with a stirring device 5 and C represents a separator which separates the crystals from the mother liquor. Solution to be crystallized is fed to the heat exchanger $A_1$ through lines 1 pump 12 and line 14. Recycled liquor from the crystallizer B can be fed to the precrystallizer $A_1$ through screen 11, line 2, pump 12 and line 14. Recycled mother liquor from the separator C can be recycled to the precrystallizer through line 8, pump 10 and line 13. The suspension of crystal nuclei formed in precrystallizer $A_1$ flows through line 4 to crystallizer B and is rapidly mixed with the contents of the crystallizer by stirrer 5. A suspension of crystals flow from the crystallizer B through the line 6 to crystal separator C. Crystals are separated from the mother liquor and discharged through line 7. The mother liquor is discharged via lines 8 and 9 with a portion recycled to the precrystallizer $A_1$.

Figure 2:
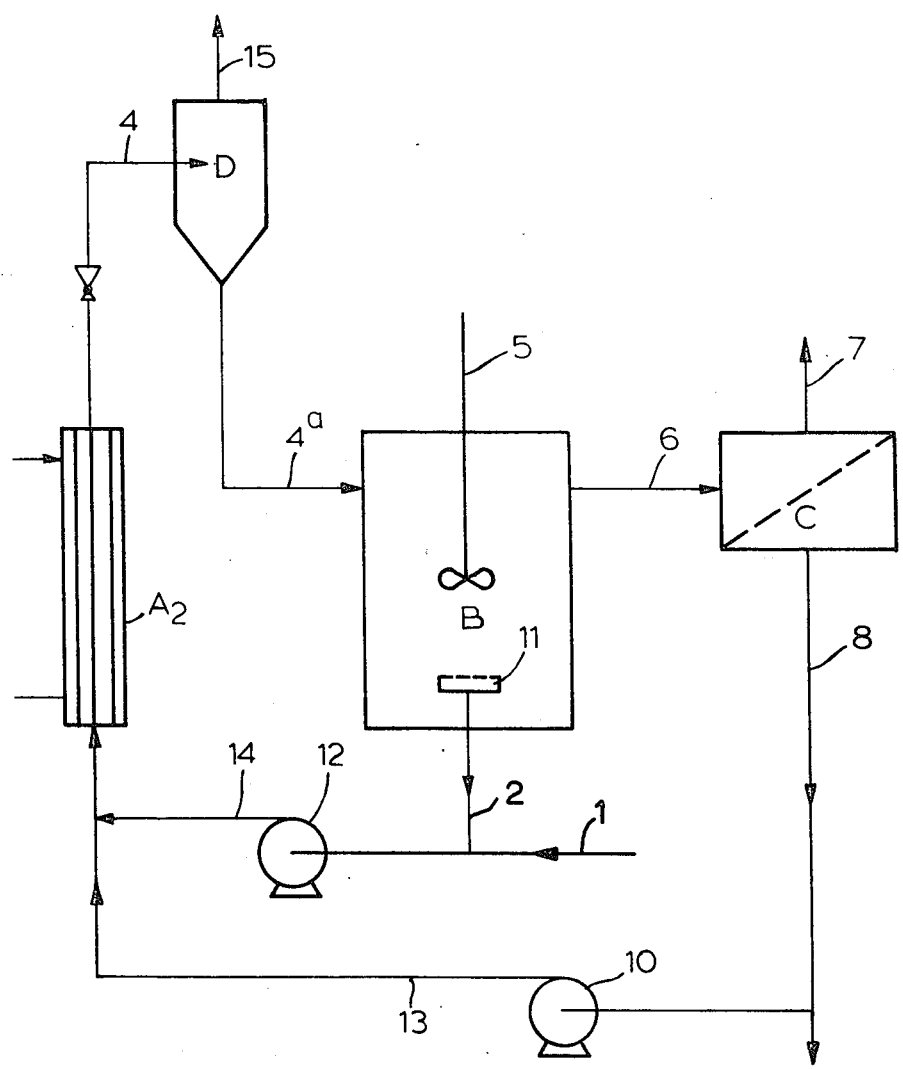
FIG. 2 is a schematic representation of another preferred mode and apparatus in which to conduct the process of this invention.

An alternative arrangement of apparatus for performing the process of the present invention is shown in FIG. 2. In FIG. 2, $A_2$ represents a one phase heat exchanger, D represents a vapor liquid separator. The remaining apparatus being the same as in FIG. 1. The liquor leaving the heat exchanger $A_2$ flows to separator D through line 4. The nuclei-liquor suspension formed in the separator D flows to the crystallizer B through line 4a. Solvent vapor is drawn from separator D through line 15 by appropriate means not shown in FIG. 2. The remaining operation of the apparatus shown in FIG. 2 is similar to that for FIG. 1 described hereinbefore.

Recirculation of the liquor from the crystallization zone to the precrystallization zone is not to be confused with recirculation of mother liquor after separation of the product crystals as by separator C shown in FIGS. 1-2. The purpose of the recirculation step is to shorten the residence time of the liquor in the precrystallizer without, at the same time, reducing the residence time of the crystals in the crystallizer.

In its apparatus aspect the invention includes, as essential components, a heat exchange means in which heat is either extracted from or supplied to the solution to be concentrated or treated such that crystal nuclei exclusively appear. To accomplish this, means are included to keep the surface of the heat exchanger contacted by the liquid to be treated free from deposited crystal nuclei. If heat is removed from the solution a scraped surface chiller is used, as described above. As an alternative the surface of the chiller is provided with a substantially nonstick surface, such as a coating of polytetrafluoroethylene, to prevent crystal adherence to the coating. A crystallizer vessel provided with an agitator to keep the contents of the vessel well-stirred and at adiabatic or substantially adiabatic conditions is used as the crystallization zone. The contents of crystallizer B are subjected to strong stirring and depending upon the conditions present in the crystallizer certain crystals may be physically reduced in size by attrition against the stirrer. Such materials are generally unsuitable for this process. Acceptable crystal producing liquids resulting in crystals of sufficient hardness to withstand mechanical conditions in crystallizer B will be apparent to the skilled worker; one of the preferred embodiments as shown in the examples is ice. Appropriate conduits are provided for flowing liquid into the precrystallizer, from the precrystallizer to the crystallizer and for discharging the liquor and separating the produced crystals. A substantially crystal-free mother liquor is withdrawn from the crystallizer while the crystal content of the liquid in the crystallizer remains nearly the same, and the crystal free or substantially crystal-free liquid is fed back into the precrystallizer. Conveniently a screen or filter means is provided with the recirculation conduit or at the end of the recirculation conduit adjacent to or within the crystallizer.

The apparatus described above including the provision for recycle of substantially crystal-free mother liquor from the crystallizer to the precrystallizer has a number of advantages which will be explained with reference to the accompanying drawings, FIGS. 3–8.

Figure 3:
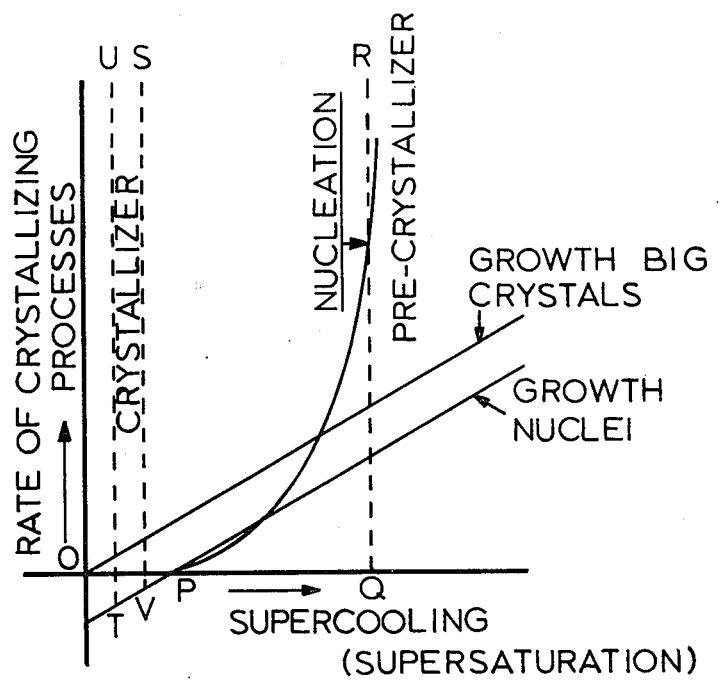
FIG. 3 is a graphic representation of the rate of crystallizing processes plotted against the amount of supersaturation according to the invention.

In FIG. 3 a graphical representation is displayed for the rate of the crystallizing process as a function of supercooling or supersaturation. The rate of crystal growth is represented by two substantially straight, parallel lines, the upper line being the growth rate for the large crystals and the lower line the growth rate for the smaller crystals. Thus, for supercooling between points O and P there is a negative growth rate for the small crystal nuclei. This is in agreement with the fact that only for a supercooling value greater than OP does nucleation appear. In the precrystallizer a high rate of supercooling is selected and the process is preferably conducted in the area to the right of line Q-R in the area of very high rate of crystallization. On the other hand, the crystallizer is preferably operated under conditions such that the process is conducted within the area defined by points V, S, T and U. As can be seen the growth rate of the nuclei and the small crystals is negative in this area, while the growth rate of the bigger crystals is positive. The crystallizer is vigorously stirred so that the contents of the vessel are substantially homogeneous and at least some crystal nuclei remain in the vessel providing a certain rate of conversion of crystal nuclei into larger crystals.

According to the above discussion the apparatus of the present invention provides a distinct separation between the process in the crystallization zone and the process in the precrystallization zone, for in the latter many crystal nuclei are formed with only an incidental quantity of larger crystals, the rate of nucleation being very large as compared to the rate of crystal growth. In the crystallization zone no nuclei will be formed at all and only more a very few will remain.

The process, as described above, requires satisfaction of a number of predetermined conditions in order to operate at the optimum. First, the crystal nuclei generated in the precrystallization zone must be removed or whisked away as soon as they are formed so as not to give them a chance to grow, and to this end means are provided to prevent the growth of crystal nuclei on or their adherence to the surface of the precrystallizer vessel. Secondly, in the crystallization zone there must be a thorough mixing of large crystals and nuclei. Thirdly, the recirculated liquor must be substantially free from crystals. If this is not the case, the few small crystals or nuclei remaining in the liquor of the crystallizer will make a second pass, a third pass, and so forth through the precrystallization zone giving them a chance to grow in the precrystallization zone.

It will be clear that the more crystal free the recirculated solution is the better the results, with respect to the size of the finally produced crystals, are. The capacity of filter 11 to hold back the small crystals is not at its optimum when the process is started up, given the fact that the layer of crystals held back in front of the filter (11) has a very important additional filtering effect. For this reason in starting up the process, small crystals will pass through the filter which later on will be held back by it. For this reason if need be, when starting up the process the recirculated liquid may be slightly heated to melt the small crystals which have not been held back, before the liquid stream enters the precrystallization zone. Recirculation of the substantially crystal free liquor is mandatory for three reasons: a. recirculation is necessary to shorten the residence time of the nuclei in the precrystallization zone; b. in the crystallization zone heat will be generated by the crystallization process so that the temperature tends to rise; and c. similarly the temperature tends to rise according to the input of heat energy by the stirrer. A recirculation ratio, being the ratio between the weights of recirculated substantial crystal free liquor and feed resp., of from 3 : 1 to 25 : 1 is preferred.

The apparatus according to the present invention enables a rapid crystallization process with a comparatively small heat exchanger producing a mass of crystals which is easily purified.

The question of easy purification is of paramount practical importance in the technology of crystallization in many instance, for example in the food processing industry. The use of a centrifuge as in prior approaches has the distinct disadvantages of loss of flavor components by volatilization and oxidation of chemically delicate components might occur leading to off-flavors. Moreover, removal of the mother liquor is not complete in one pass so that recrystallization is often necessary. A washing column of the type described in copending application Ser. No. 156,717, filed June 25, 1971, the disclosure of which is hereby incorporated by reference, accomplishes all of the above objectives but in a washing column, even more than a centrifuge, it is necessary to keep the resistance of the filter bed low for it has been found that crystals smaller than a predetermined size as they clog the interstices in the crystal bed which is being washed so that the resistance to flow of liquor increases enormously.

From theoretical considerations a relation can be deduced between the pressure drop (AP) over a crystal bed and the size of the particles in a filter bed build up by said particles. This relation may be expressed by the equation:

$$\Delta P = C/D^2$$

wherein $C$ is a constant for a given solution and $D$ is the diameter of equally sized spherical particles packed in a filter bed of a given depth.

Figure 4:
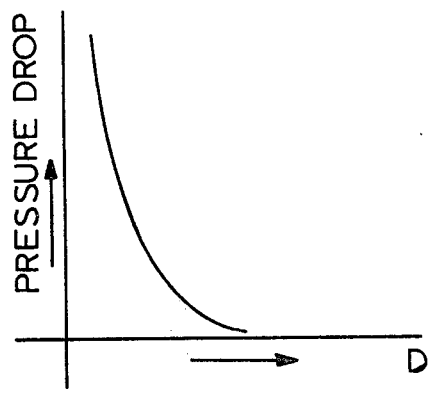
FIG. 4 is a graphic representation of the pressure drop in a crystal bed composed of spherical crystals all of the same size plotted against the diameter of the crystals.

Using this equation the graphical representation in FIG. 4 results.

Now, in a crystal mass consisting of a mixture of differently sized crystals the overall size may be characterized by an effective apparent diameter — $D_{eff}$ — corresponding with the diameter of equally sized spherical particles which — if packed in a filter bed of the same depth as the actual crystal bed under consideration — would give the same resistance against liquid flow.

Figure 5:
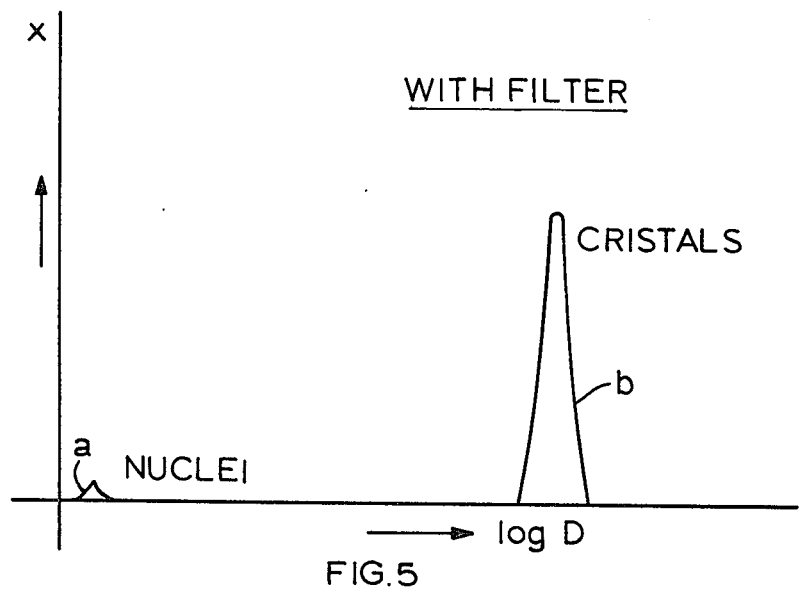
FIG. 5 is a graphic illustration of the weight fraction of the crystals in suspension in the recrystallizer plotted against the dimension of the crystals according to the invention.
Figure 6:
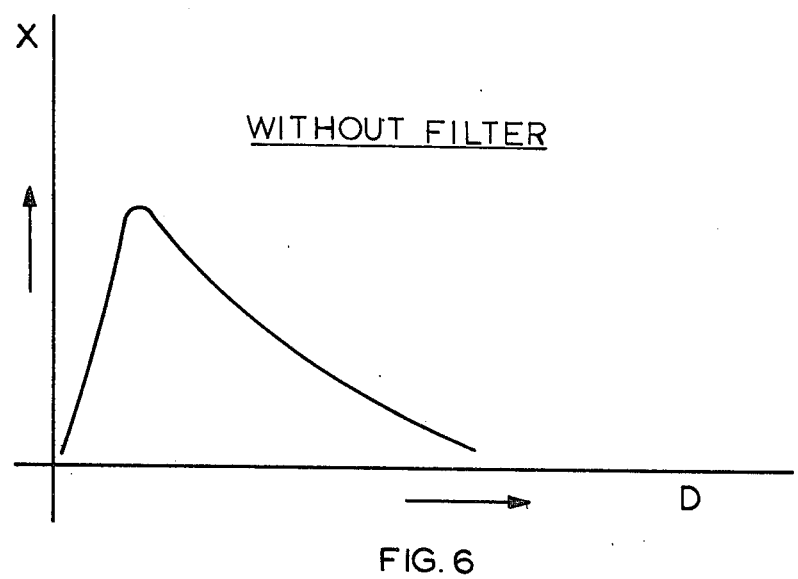
FIG. 6 is a graphic illustration of the weight fraction of the crystals in suspension in the recrystallization zone plotted against the dimension of the crystals when no filter is used.

FIGS. 5 and 6 show graphically the difference between conducting the process with and without the filter means in the recirculation conduit between the crystallizer and precrystallizer. In these figures X represents the weight fraction of the crystals in suspension in the recrystallizer and D represents the size of the crystal expressed in microns. In FIG. 5 the crystal size is expressed as the log of D and the distance between curve $a$ and $b$ is very large. From a comparison of FIGS. 5 and 6 it will be observed that when using a filter in the recirculation conduit as shown in FIG. 5, the size distribution is such that the crystals can be packed into a bed that is easily washed, whereas without the filter in the recirculation conduit the size distribution is such that a large resistance is built up in the crystal bed being washed. This is due to the fact that many crystals of small and intermediate size fill up the interstices between the bigger crystals. Presence of the filter in the recirculation conduit means, of course, that the solution or mother liquor being transferred is crystal free or substantially crystal free.

The invention will be further illustrated by the following examples; unless otherwise indicated all parts and percentages are by weight.

EXAMPLE 1

A sugar solution of 10% by weight was concentrated by formation of ice crystals using the apparatus and arrangement as schematically shown in FIG. 1.

The 10% by weight sugar solution was supplied to the scraped heat exchanger at a rate of 100 kg/hour along with 3058 kg/hour of substantial crystal free liquor withdrawn from the crystallizer and recirculated in line 14. The recycle liquor had a sugar concentration of approximately 30% by weight. The heat-exchanger had an effective heat-exchange surface of 0.35 m², and the temperature difference between the solution and the cooling medium was kept at approximately 25° C resulting in a heat flux of about 25,000 kcal/m²/h. Ice nuclei were formed in the heat-exchanger at a rate of 68 kg/hour.

The residence time for the solution to pass through the heat-exchanger and to the crystallizer was approximately four seconds. The ice nuclei formed in the heat-exchanger were all of a size smaller than 5 microns. The suspension from the heat-exchanger was rapidly mixed with the contents of the crystallizer by intensive agitation. The crystallizer was sized to hold approximately 800 liters of crystal-liquor suspension. As mentioned earlier, 3058 kg/hour of the crystal free liquor from the crystallizer was recirculated back to the heat-exchanger. The level in the crystallizer was kept constant by removing 266 kg/hour of ice crystal/liquor suspension from the crystallizer through line 6 to the separating device C. Ice crystals 66.6 kg/hour, were separated from the liquor and discharged through line 7. A 30% by weight, concentrated sugar product flow of 33.4 kg/hour was discharged through line 9 and 166.8 kg/hour of the 30% sugar solution was recycled to the heat-exchanger through line 13. The product crystals which were obtained had an average size of 0.6 mm and were virtually spherical in shape.

EXAMPLE 2

An aqueous solution of 50% by weight $MgSO_4 \cdot 7 H_2O$ was processed using the apparatus and arrangement schematically shown in FIG. 2. The 50% by weight salt solution was introduced at a rate of 33 kg/hour and a temperature of approximately 20° C to the heat-exchanger $A_2$. A 60% by weight crystal free salt solution is recycled at a rate of 300 kg/hour from the crystallizer and 83.5 kg/hour from separator C and introduced with the 50% by weight feed solution to the heat-exchanger. The total flow of solution to the heat-exchanger had a temperature of approximately 35° C.

The heat-exchanger had an effective heat-exchange surface of 0.03 m², and was supplied with low pressure steam which indirectly heated the feed solution to 41.5° C, resulting in a heat flux of approximately 100,000 kcal/m² hour. The heated solution coming from the heat-exchanger was fed to the vapor liquor separator D where the pressure was reduced to 30 mm Hg absolute from the atmospheric pressure in the heat-exchanger. Water vapor was discharged through line 15 which simultaneously increased the salt concentration of the remaining solution and reduced the temperature of the solution, and as a result, $MgSO_4 \cdot 7 H_2O$ nuclei formed. The nuclei containing suspension from the vapor-liquor separator was fed to the crystallizer and rapidly mixed with the contents of the crystallizer by violent agitation in the crystallizer. The average residence time of the suspension in the vapor-liquor separator was approximately 5 seconds.

The crystallizer had an effective volume of 200 liters. The average residence time for crystals in the crystallizer was about 3 hours. As mentioned earlier, 300 kg/hour of liquor are recycled from the crystallizer by way of pump 12 and line 14 back to the heat-exchanger. A suspension of crystals and liquor was continuously discharged from the crystallizer to the crystal separator C at a rate of 100 kg/hour. Crystals of $MgSO_4 \cdot 7 H_2O$ having an average size of 1 mm withdrawn from the separator C at a rate of 16.5 kg/hour. The liquor from the separator C was returned via lines 8 and 13 to the heat-exchanger at a rate of 83.5 kg/hour. The liquor from the separator C contained approximately 60% by weight of the dissolved magnesium salt.

EXAMPLE 3

Instead of a 10% by weight sugar solution as described in Example 1, now in the same apparatus as 21% by weight sugar solution was concentrated by formation of ice crystals. The solution to be concentrated was supplied at a rate of 300 kg/hour, and the feed was mixed before entrance into the scraped surface heat exchanger with 5700 kg of substantially free recycle liquid withdrawn from the crystallizer B via filter 11, pump 12 and conduit 14. The recycle liquor had a sugar concentration of approximately 30% by weight. An ice crystal-liquor suspension containing 30 wt % ice in an amount of 300 kg/hour was continuously removed from the crystallizer through conduit 6, the diameter ($D_{eff}$) of the produced ice crystals apeared to be about 650 microns.

EXAMPLE 4 (comparative)

The concentration of a 21% by weight sugar solution as described in Example 3, was repeated under the same conditions, with the only difference that the filter 11 in crystallizer B was idle. Thus contrary to the process of Example 3, not a substantial crystal free liquid but a crystal suspension in an amount of 5700 kg was recycled.

300 kg of a crystal ice-sugar solution containing 30 wt % of ice was continuously removed from the crystallizer, the diameter ($D_{eff}$) of the produced ice crystals now appeared to be merely about 80 microns.

In contradistinction to the coarse ice crystals produced in Example 3 the separation of the small ice crystals from the concentrated sugar solution in a wash column is now almost impossible due to the great resistance of the crystal bed against liquid flow.

What is claimed is:

1. In an apparatus for producing crystals from a stream of solution comprising a heat exchange vessel for producing crystal nuclei whereby said solution is caused to become supersaturated with respect to said crystallizable component and to form said nuclei; a crystallizer vessel for recrystallizing whereby crystal growth is promoted and a separator vessel wherein a first conduit means connects said crystallizer vessel to said heat exchange vessel and a second conduit means connects said crystallizer vesel to said separator vessel so that said solution passes continuously from said heat exchange vessel to said crystallizer vessel wherein small crystals are formed in said heat exchange vessel and larger crystals are formed in said stream of solution in said crystallizer vessel and wherein crystals are separated from said solution in said separator vessel, the improvement comprising wherein the crystallizer is equipped with a means for rapidly mixing the stream of solution to produce a substantially homogenuous mixture therein and promote growth of said larger crystals whereby substantially all of said small crystal nuclei are dissolved thereby promoting growth of said larger crystals, and the apparatus includes a means for removing crystal-free liquor from said crystallizer vessel and means to recirculate crystal-free solution from said crystallizer vessel to said heat exchange vessel while retaining the crystals dispersed in said crystallizer vessel and a third conduit connected between said heat exchange vessel and said crystallizer vessel for carrying the crystal-free solution.

2. Apparatus as claimed in claim 1 wherein said means for exchanging heat with said stream further includes means for continuously scraping the surface of the heat exchange in contact with said stream to prevent accumulation of crystals on said surface.

3. Apparatus as claimed in claim 1 wherein said means for exchanging heat is provided with a substantially nonstick surface in contact with said stream.

4. Apparatus as claimed in claim 1 further including a pumping means associated with said conduit for recirculating said substantially crystal-free fraction to said precrystallizer.

5. The apparatus of claim 1, which further includes a fourth conduit means, said fourth conduit means connecting and being in communication with said heat exchange apparatus (a) and said separator, (c), whereby mother liquor in separator (c) can be recycled to heat exchange apparatus (a).

6. The apparatus of claim 5, wherein said heat exchanger (a) is equipped with a scraping device.

7. The apparatus of claim 6, wherein said means (1) is a screen.

* * * * *